US006797333B2

(12) United States Patent
Haase et al.

(10) Patent No.: US 6,797,333 B2
(45) Date of Patent: Sep. 28, 2004

(54) POST-CURE TREATMENT OF SILICONE COATING FOR LINERS IN PRESSURE-SENSITIVE LABELS (75) Inventors: Roger L. Haase, Arlington Heights, IL (US); Carl J. Walliser, Mundelein, IL (US)

(73) Assignee: Print-O-Tape, Inc., Mundelein, IL (US)

( * ) Notice: Subject to any disclaimer, the term of this patent is extended or adjusted under 35 U.S.C. 154(b) by 18 days.

(21) Appl. No.: 10/159,466

(22) Filed: May 31, 2002

(65) Prior Publication Data

US 2003/0008081 A1 Jan. 9, 2003

Related U.S. Application Data (60) Provisional application No. 60/299,057, filed on Jun. 18, 2001.

(51) Int. Cl.[7] .................................................. C08J 7/04
(52) U.S. Cl. ................. 427/515; 427/208.4; 427/208.8; 427/288; 427/386; 427/387; 427/407.1; 427/516; 427/521; 427/553; 427/557; 427/558; 427/559; 427/595; 156/60
(58) Field of Search ........................... 427/208.4, 208.8, 427/288, 386, 387, 407.1, 515, 516, 521, 553, 557, 558, 559, 595; 156/60

(56) References Cited

U.S. PATENT DOCUMENTS

| | | |
|---|---|---|
| 4,391,853 A | 7/1983 | Pointon |
| 4,558,147 A | 12/1985 | Eckberg et al. |
| 4,576,999 A | 3/1986 | Eckberg |
| 4,851,383 A | 7/1989 | Fickenscher et al. |
| 5,073,422 A | 12/1991 | Konno et al. |
| 5,250,336 A | 10/1993 | Greuse et al. |
| 5,358,977 A | 10/1994 | Krankkala et al. |
| 5,593,749 A | 1/1997 | Instance |
| 5,650,215 A | 7/1997 | Mazurek et al. |
| 5,667,858 A | 9/1997 | Pokorny |
| 5,750,587 A | 5/1998 | Manzoonji et al. |
| 5,807,619 A | 9/1998 | Freedman |
| 5,866,249 A | 2/1999 | Yarusso et al. |
| 5,888,650 A | 3/1999 | Calhoun et al. |
| 5,955,399 A | 9/1999 | Takao et al. |
| 6,030,482 A | 2/2000 | Osaka |
| 6,066,378 A | 5/2000 | Morii et al. |
| 6,110,554 A | 8/2000 | Mueller et al. |
| 6,150,035 A | 11/2000 | DeFife et al. |
| 6,187,432 B1 | 2/2001 | Krish et al. |
| 6,187,834 B1 | 2/2001 | Thayer et al. |
| 6,534,126 B1 | 3/2003 | Blackwood et al. |

*Primary Examiner*—Bernard Pianalto
(74) *Attorney, Agent, or Firm*—Eugene F. Friedman

(57) ABSTRACT

A treatment for silicone liner coatings after undergoing UV curing. The silicone coats a liner to facilitate its removal from the adhesive attached to a label. The silicone, while a liquid, forms a layer on the liner. UV radiation cures the liquid silicone and causes it to become a coherent, virtually solid layer. Heating the cured silicone layer and allowing it to rest for a short period of time then permits the immediate contact with it of the label's adhesive side without incurring inseparability of the silicone-coated liner from the adhesive-coated label.

244 Claims, 4 Drawing Sheets

POST-CURE TREATMENT OF SILICONE COATING FOR LINERS IN PRESSURE-SENSITIVE LABELS

CROSS REFERENCE TO RELATED APPLICATION

The benefit of the filing date of U.S. provisional patent application serial No. 60/299,057, filed Jun. 18, 2001, is claimed for the present application.

BACKGROUND

Pressure-sensitive labels have become almost ubiquitous in modern society. As only one example, they appear on the vast majority of all shipped packages. They are also used to identify parts in manufactured goods and manufacturing equipment. Another example of a very large pressure-sensitive "label" is shelf or drawer liner sold as "Contac®" paper.

As another instance of the use of pressure-sensitive labels, baggage tags (or more commonly "bag tags"), have become unavoidable, certainly in the vicinity of commercial airports. The airlines affix the tags to passengers' luggage to indicate both the destination of the articles as well as the items' owners. To include this information, airlines actually print tags when a passenger appears for a flight. The attendant then takes the printed tag, removes a liner sheet, slips it through the handle of the luggage, and adheres it to itself. If the parcel has no handle, such as a carton, then the tag simply sticks directly to the item.

Figures 1, 2A, 2B, 2C, 2D, 2E, 2F:
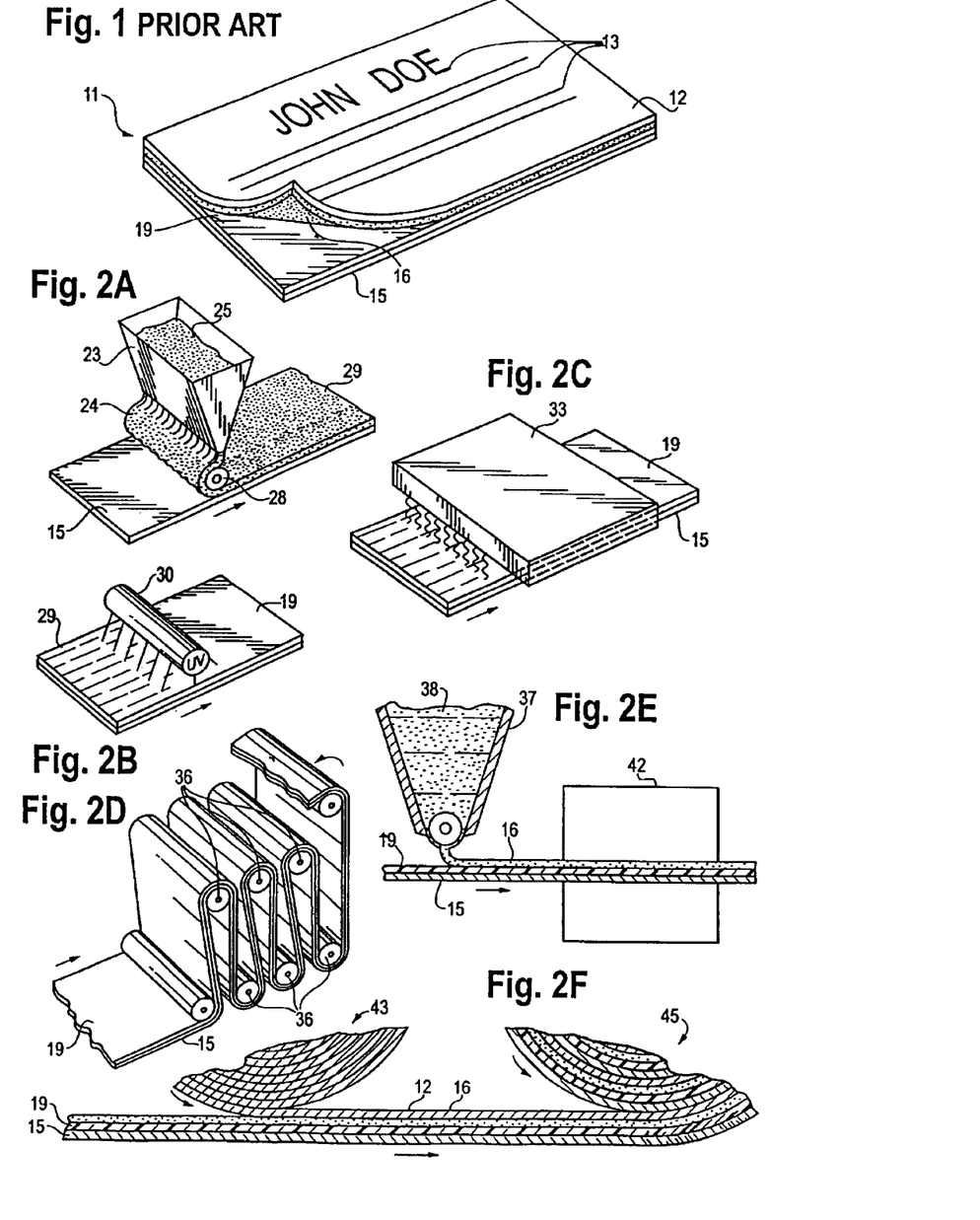
FIG. 1 illustrates the construction of an ordinary pressure-sensitive label as currently used by many airlines amongst others.
FIG. 2A illustrates the application of a layer of liquid UV curable silicone to a liner face sheet.
FIG. 2B diagrams the curing of the silicone layer through the application of UV radiation.
FIG. 2C gives the post-cure treatment of the silicone layer through heating.
FIG. 2D shows the waiting period after the heating of the heated silicone layer achieved by a convoluted path followed by the liner with the cured and heated silicone.
FIG. 2E illustrates the application of an adhesive to the cured and heated silicone layer after the latter has undergone the waiting period of FIG. 2D.
FIG. 2F gives the last step in the creation of a label in which the face sheet attaches to the remaining layers through contact with the adhesive layer.

The construction of a typical pressure-sensitive label currently in use appears in FIG. 1. There the label, indicated generally at 11, includes the face sheet 12 upon which appears the desired printing 13. In the case of a shipped package, the information identifies and locates the shipper and the recipient. For the example of bag tags, the printing may not only identify the bag's destination and owner, but will usually indicate the airline on which the passenger commences his or her journey. The airline identifier (and logo) typically arrives preprinted on the tag when delivered to the carrier by the tag's producer.

The face sheet generally has a composition of paper or plastic. The information 13 for a general label can be placed on it by a computer's printer or any suitable device.

For a bag tag, the identification of the bag's destination and owner can only be placed on the tag 11 at the airport. To accomplish this printing, many if not most, baggage tags' face sheet 12 have a thermally printable composition. Suitable thermally-printable papers are provided by Appleton Papers Inc. of Appleton, Wis., and by Ricoh Electronics Inc. of Santa Ana, Calif. Each of the baggage stands then possesses a thermal printer which, through the application of heat, places the necessary information on the tag's face sheet 12.

Accordingly, the process described below will produce label stock for a very wide range of pressure sensitive labels. Most labels may utilize ordinary paper or plastic as the face sheet 12. Bag tags can employ the direct thermal printing process described above.

In addition, the indirect thermal printing process, as opposed to the direct thermal, process described below, uses ordinary, but smooth, paper as the face sheet 12. The thermal printing head actually applies the heat to a ribbon which contains ink. The heat releases the ink from the ribbon which deposits it on the face sheet to produce the printing.

With the information 13 on the face sheet 12, the operator removes the liner sheet 15 from the adhesive 16 on the backside of the face sheet 12. With the adhesive 16 exposed, the user places the face sheet 12 with the adhesive directly on the package or the equipment. Dyna-Tech Adhesives Incorporated of Grafton, W. Va. provides a suitable general-purpose adhesive under the designation DyTac 2057. This adhesive has a composition of a styrene-butadiene polymer and constitutes an organic phase dispersed as an emulsion in an aqueous phase.

For a bag tag, the airline personnel places part of the tag through the bag's handle and sticks the adhesive to a portion of the tag which still the liner sheet attached. Sticking the adhesive to the remaining liner forms a loop of the tag around the handle. Alternately, if the bag or parcel has no handle, the attendant removes all of the liner 15 from the tag 11 and sticks it directly to the item.

In either event, the liner must remove virtually completely from the adhesive so that the latter can facilely attach to another surface. If portions of the liner 15, typically composed of paper, remains on the adhesive 16, then the covered adhesive would not achieve a secure affixation of the label to its item. In the case of bag tags, the resulting dislodged tag would create a lost bag to the distress of both the passenger and the airline.

To achieve a clean separation of the liner 15 from the adhesive 16, the former carries the silicone coating 19 attached to it. The coating 19, firmly affixed to the liner 15, presents a smooth, relatively nonadherent surface to the adhesive 16. Pulling off the liner 15 with its silicone coating 19 results in a clean, sticky layer of adhesive 16 attached to the face sheet 12. Stated in other words, the silicone coating 10, affixed to the liner 15, permits the release of the adhesive 16 from itself and thus the liner 15. This leaves the face sheet 12 with an exposed layer of adhesive 16.

The manufacture of the label 11 generally commences with the coating of the paper liner 15 with the silicone 19. A type of silicone finding frequent use in this day of environmental concerns takes the form of a UV curable silicone polymerizable liquid. Use of this category of silicone avoids the problem of evaporating hydrocarbons into the atmosphere. Curing the liquid silicone entail shining it with UV radiation. This causes the silicone monomers to combine, leaving a unified mass of silicone coating 19 firmly attached to the liner 15. Blissfully, the process places substantially no pollutants into the atmosphere.

Suitable components for UV-curable silicone solutions are supplied by Rhodia Inc. of Rock Hill, S.C. A liquid for an easily releasable layer may include 100 parts of UV-curable silicone polymer (Rhodia product PC-600); 2.5 parts of cationic photoinitiator (PC-702); and CRA-minus release modifier (PC-670). The silicone itself has a composition of an epoxy-modified polydimethylsiloxane. This type of compound comes from the class of epoxy-modified polysiloxanes which may well provide other suitable moieties.

For a silicone layer with a tighter release, the above solution may include 5 to 55 parts (depending upon the desired characteristics of the silicone layer) of CRA-plus release modifier (PC-680). Free radical photoinitiators may alternately find use in appropriate solutions.

Promptly after receiving the UV radiation, the silicone 19 cures into a reasonably hard mass firmly affixed to the paper liner 15. However, it cannot then receive the adhesive 16, Placing the adhesive onto the newly cured silicone layer 19 will cause these two layers 16 and 19 to stick together. This represents a clearly unacceptable situation. Instead, to avoid this clearly deleterious situation, the silicone layer 19 must sit on the liner 15 at least several hours if not a whole day before contacting the adhesive 16 to avoid the unacceptable results indicated above. The necessity for delay seems remarkable in light of the fact that the newly cured silicone seems hard, smooth, and ready for further use. In fact, during the delay, the silicone-coated liner can be wrapped into a large roll and, after the delay period, unrolled and used without displaying any negative effects.

In fact, rolling the liner with the newly cured silicone into a large cylinder represents the usual manufacturing process. Simply stated, the liner with the new silicone coating cannot remain on the manufacturing equipment and render it useless for the time required for the silicone to remain out of contact with an adhesive. Accordingly, the usual manufacturing process involves a machine placing the uncured silicone on the liner 15. The silicone undergoes UV curing. Then the machine rolls the liner 15 with the cured silicone layer 19 onto a roll, which is removed from the machinery and left to sit for the substantial period of time necessary to render the silicone substantially less adherent to the adhesive 16. After the delay period, the roll is then placed onto machinery. This permits the completion of the manufacturing process by placing adhesive 16 onto the silicone 19 and then attaching the face sheet 12.

Removing the roll of silicone-coated liner, allowing it to simply stand for an extended period of time, and placing it back on a machine again represents a substantial manufacturing effort. Eliminating these steps would achieve a significant economy in the production of pressure-sensitive label stock.

SUMMARY

Heating the silicone coating after its UV curing and waiting briefly before applying an adhesive permits the further processing of the material without the necessity of removing it from the equipment and allowing it to stand idle. Although the silicone appears cured and hard, the subsequent heating and short wait places it in condition to contact the adhesive without excessively sticking to it.

Fundamentally, an improved method of treating a UV-cured silicone layer on a substrate comprises first heating the UV-cured silicone at an elevated temperature. After heating the silicone layer at the elevated temperature, the silicone layer is kept free from contact with an adhesive for a predetermined period of time. This time period conditions the heated silicone to receive the adhesive without deleterious effects and depends primarily on the silicone and the adhesive.

After the passage of the predetermined period of time after heating the silicone at the elevated temperature, an adhesive layer may be applied to the silicone. This process permits the subsequent separation of the two layers when they constitute part of a label.

Completing the pressure-sensitive label stock involves adhering a face sheet to the adhesive. The face sheet, of course, will carry the information identifying the equipment, the package's sender and recipient, or the bag's destination and owner. Actually, the face sheet may adhere to the adhesive either before the adhesive is applied to the liner or after. If before, the adhesive forms a layer on the face sheet and the two placed against the liner with the silicone coating, with the adhesive contacting the silicone.

Actually, the complete process of making the label stock starts with coating a liner sheet, usually paper, with an uncured, liquid, UV-curable silicone. The film of liquid silicone undergoes curing through exposure to UV radiation. Finishing the bag tags then proceeds through the various steps outlined above. With the heating of the cured silicone followed by the short delay, the materials need never leave the manufacturing equipment from the beginning to the end.

BRIEF DESCRIPTION OF THE FIGURES

FIG. 2 shows the steps in the construction of the label of FIG. 1 but which the necessity of a lengthy delay period between the UV curing of the silicone layer and the application of an adhesive. In this figure:

DETAILED DESCRIPTION

FIG. 2A shows the first step in the manufacturing of the pressure-sensitive label 11 of FIG. 1. In FIG. 2A, the dispenser 23 places a thin coating 24 of UV-curable, liquid silicone 25 onto the roller 28. The roller 28, in turn, transfers the coating 24 of silicone onto the liner sheet 15 in the form of the thin layer 29 of liquid silicone. In FIG. 2B, The lamp 30 shines UV radiation onto the liquid silicone 29 to cure it into the solid film 19 adhered to the liner 15.

In FIG. 2A, the infrared irradiator heats the cured silicone layer 19 at an elevated temperature. The ambient temperature may rise to 125, 150, or even 200 F.

After passing through the IR heater, the liner 15 with its cured and heated silicone layer passes over the series of rollers 36. The extended, convoluted path created by the rollers provides a short delay between the heating of the IR irradiators and the subsequent treatment of the liner 15 with the heated silicone layer 19. The delay need not be long. Ten seconds will typically permit the immediate "tandem" processing of the silicone layer by placing an adhesive upon it. However, even shorter periods of seven or even three seconds may suffice to treat the cured silicone.

After the short delay caused by the convoluted path set up by the rollers 36, the silicone layer 15 may then immediately and safely come into contact with an adhesive. This occurs in FIG. 2E where the glue dispenser 37 places the adhesive 38 as the thin film 16 onto the silicone layer 19. The three layers 15, 16, and 19 then pass through the oven 42 to partially dry the adhesive 16.

After departing the oven 42, the sandwich of the three layers 15, 16, and 19 receives the face sheet 13 from the roll 43 which sticks to the adhesive 19. The four-layer structure is finally reeled into the roll 45. The roll 45 may undergo further processing as necessary such as receiving the airline's name and logo and die cutting for use in the bag-tag printer at the airport.

As a slight variation in the process, the face sheet 12 may receive the adhesive 38 from the dispenser 37. This combination of face sheet 12 and adhesive 16 then passes through the oven 42 to dry the latter. Then the adhesive 16, lining the face sheet 12, contacts and sticks to the silicone layer 19 on the liner 15 to form the final four-layer label structure 11 of FIG. 1.

Figure 3:
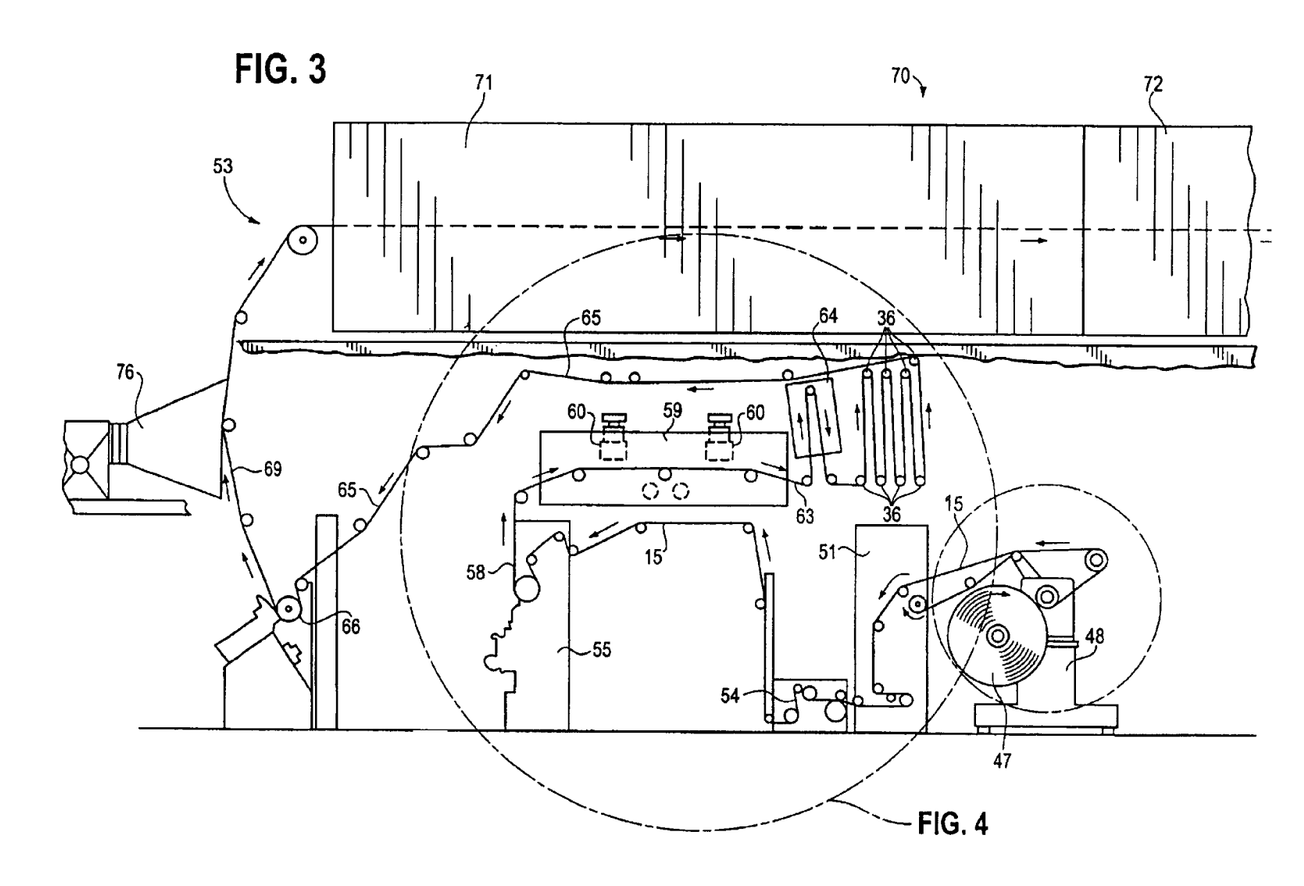
FIG. 3 provides a general diagram of apparatus of equipment manufacturing pressure-sensitive labels through the process illustrated in FIG. 2.
Figure 4:
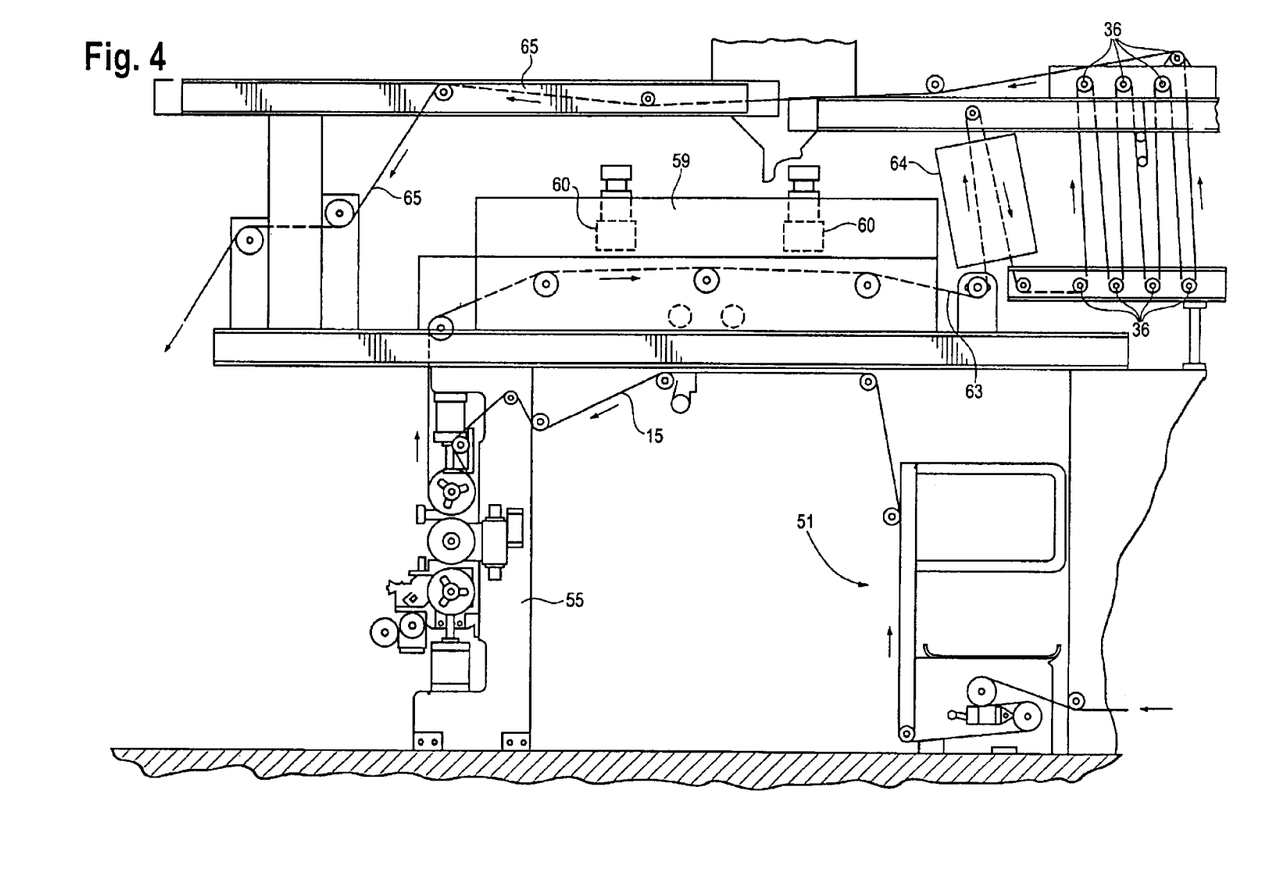
FIG. 4 gives an enlarged view of the portion of the portion of the equipment of FIG. 3 which applies liquid silicone to the liner, cures it, and then heats it and provides a subsequent delay period.

The actual equipment for preparing the four-layer label of FIG. 1 by the "tandem" process appears in FIG. 3 with the details for the post-cure treatment of the silicone shown in FIG. 4. As stated above, this process permits the complete preparation of the label stock without removing the partially treated material from the equipment, especially between the curing of the silicone and the placement of the adhesive on it. Aside from the components discussed below with regards to FIG. 4, the apparatus in FIG. 3 represents standard equipment obtained from the Faustel company in Germantown, Wis.

To begin the process, the liner sheet 15 comes off the roll 47 held on the unwind stand 48. The unwinder 48 permits the placement of a second roll in location for subsequent use as the first roll 47 becomes completely consumed. From the unwinder 48, the liner 19 travels to the unwind splicer 51. As the end of the roll 47 passes to the splicer 51, the beginning edge of the next roll travels there as well. The splicer 51 then attaches the end of the first roll to the beginning of the second roll to establish a continuous web of material passing through the apparatus indicated generally at 53.

The equipment 53 next utilizes the infeed drawer 54 to actually pull the liner 15 off the roll 47 and through the splicer 51. The liner 15 next passes to the #1 coater 55 where it receives a film of liquid silicone.

The components of the equipment 53 that place and treat the silicone appear in greater detail in FIG. 4. They permit the continuous, "tandem" treatment of the liner 15 from placing the silicone through the application of the adhesive without the necessity of removing the partially completed material and later replacing it on the equipment.

After departing the coater 55, the liner now has a thin film of essentially liquid silicone, with the two layers collectively identified as 58. From there, it travels to the curing unit 59 which shines UV radiation from the lamps 60 onto the silicone coating on the liner 58. The UV radiation "cures" the silicone to a substantially rigid layer 19.

The liner 15 with the rigid film 19, now identified as 63, then passes from the curing unit 59 directly to the heater 64. There, infrared heaters provide an atmosphere at an elevated temperature to help prepare the silicone for the adhesive. As indicated above and depending upon the actual silicone used and the delay period, the temperature may rise to 125, 150, 200 degrees or even higher. Suitable IR lamps include the Radplane series 80 infrared heaters from Glenro Inc. in Patterson, N.J.

As indicated above, after the warming at the heater 64, the coated liner 63 must wait a short period of time, usually 10 seconds, before receiving the application of the adhesive. Without the brief waiting period, the adhesive will firmly bond to the silicone, destroying the very reason for having the silicone on the liner. The apparatus shown in FIG. 3 and more particularly in FIG. 4 accomplishes the delay while still allowing the coated liner to move through the equipment 53 at its normal pace of so many linear feet per minute, which may typically run at approximately 300 TO 450 ft./min.

After departing the heater 64, the coated liner 63 then follows the convoluted path created by the rollers 36. After leaving the rollers 36, the coated liner 63 travels along the overhead path 65 until it reaches the next treating station 66. The combined length of coated liner on the rollers 36 plus that on the overhead path 65 amounts to 51 feet Travelling at the above speed of 300 ft/min., the path length of 51 feet induces a delay of about 10 seconds from the time that the cured silicone passes through heater 64 until it reaches the next treating station 66. At a line speed of approximately 450 ft./min., a delay of about seven seconds. In either event, the delay permits the heated silicone to pass into a state where it has only a slight affinity for the adhesive that will subsequently be applied to it.

The next, or second coating, station 66, applies a thin layer of generally liquid adhesive to the silicone-coated liner 65. In particular, the coater #2 66 places the adhesive in contact with the silicone.

From the second coater 66, the three layer structure 69 now incorporating the liner, cured silicone, and wet adhesive travels to the dryer indicated generally at 70 in the two drawing sheets 2/4 and 3/4. The dryer 70 really has the two oven zones 71 and 72, the latter appearing more fully on sheet 3/4. The dryer 70 utilizes heat to largely dry the adhesive placed on the silicone at the second coater 66. The drying process also benefits from the action of the fan 76 which draws heat produced by the UV lamps 60 away from the equipment 59. In doing so, the fan 76 brings this hot air into contact with the adhesive-coated material 69 to help dry it.

After leaving the second zone 72 of the dryer 70, the material 69 with the dried adhesive travels to the laminator 75. There it meets the face sheet 12 which has arrived from the roll 77 held on the unwinder 78 and passed through the unwind splicer 79. The unwinder 78 and the splicer 79 serve exactly the same functions for the face sheet 12 as the unwinder 48 and splicer 51 serve for the liner 15. The laminator 75, however, in part fulfills the function of the drawer 54 to pull the face sheet 12 off of the roll 77.

More importantly, the laminator 75 brings the face sheet 12 into contact with the adhesive on the three-layer structure 69. This step creates the laminated, four-layer structure 11 which will serve as the pressure-sensitive label. The final four-layer laminate 11 then goes to the outfeeder 81 which moves the label structure 11 to the rewind splicer 82 and then to the rewinder 83. The rewinder 83 forms the arriving label stock 11 into the roll 84. The rewind splicer 82 will cut the arriving label sandwich 11 upon the completion of the roll 84. It will then place the label material 11 onto a new cardboard core to start a new roll. All of this proceeds automatically and needs no operator intervention (aside from taking off a completed roll 84 and placing a new core on the rewinder 83).

The material on the core may then undergo additional treatment to prepare it for subsequent printing and use. This can include cutting the material on the roll 84 to the width and length for the printer. In the case of many labels including bag tags, it may also involve printing the user's or airline's name and logo on the label material. The material may then be placed into smaller rolls or in a fan-fold configuration and shipped to the user.

Accordingly, what is claimed is:

1. A method of applying an adhesive layer to a substrate having thereon a layer of UV-cured silicone comprising:
   (A) heating said UV-cured silicone layer at an elevated temperature above room temperature; and
   (B) after the passage of a predetermined period of time after heating said silicone layer at said elevated temperature, applying a substantially liquid adhesive layer to said silicone layer.

2. The method of claim 1 wherein said predetermined period of time is at least about 3 seconds.

3. The method of claim 2 wherein said elevated temperature is at least about 125 degrees F.

4. The method of claim 3 wherein said predetermined period of time is at least about 7 seconds.

5. The method of claim 4 wherein said substrate comprises a paper.

6. The method of claim 5 wherein said elevated temperature is at least about 150 degrees F.

7. The method of claim 6 wherein said elevated temperature is at least about 200 degrees F.

8. The method of claim 7 wherein said adhesive comprises an organic phase dispersed as an emulsion in an aqueous phase.

9. The method of claim 8 wherein said adhesive comprises a styrene-butadiene copolymer.

10. The method of claim 3 wherein said silicone, prior to curing, is in a liquid phase.

11. The method of claim 10 said silicone, prior to curing, is a polymerizable silicone.

12. The method of claim 11 wherein said adhesive comprises an organic phase dispersed as an emulsion in an aqueous phase.

13. The method of claim 12 wherein said adhesive comprises a styrene-butadiene copolymer.

14. The method of claim 11 wherein, prior to curing, said silicone is cationic photoinitiated.

15. The method of claim 14 wherein said silicone, prior to curing, is an epoxy-modified polysiloxane.

16. The method of claim 15 wherein said silicone, prior to curing, is epoxy-modified polydimethylsiloxane.

17. The method of claim 16 wherein said substrate comprises a paper.

18. The method of claim 17 wherein said elevated temperature is at least about 150 degrees F.

19. The method of claim 18 wherein said predetermined period of time is at least about 7 seconds.

20. The method of claim 17 wherein said elevated temperature is at least about 200 degrees F.

21. The method of claim 20 wherein said adhesive comprises an organic phase dispersed as an emulsion in an aqueous phase.

22. The method of claim 21 wherein said adhesive comprises a styrene-butadiene copolymer.

23. A method of making, from a substrate having a layer of UV cured silicone, a label having a coating of adhesive and a face sheet covering said adhesive comprising:
   (A) heating said UV-cured silicone layer at an elevated temperature above room temperature;
   (B) after the passage of a predetermined period of time after heating said silicone layer at said elevated temperature, applying a substantially liquid adhesive layer to said silicone layer; and
   (C) adhering a face sheet to said adhesive layer.

24. The method of claim 23 wherein said predetermined period of time is at least about 3 seconds.

25. The method of claim 24 wherein said elevated temperature is at least about 125 degrees F.

26. The method of claim 25 wherein the steps of heating said silicone layer, applying said adhesive layer, and adhering said face sheet are all performed on a machine without removing said substrate from said machine.

27. The method of claim 26 wherein said substrate follows a convoluted path between the steps of heating said silicone layer and applying said adhesive layer.

28. The method of claim 27 wherein the step of applying an adhesive layer to said silicone layer precedes the step of adhering a face sheet to said adhesive layer.

29. The method of claim 27 wherein the step of adhering a face sheet to said adhesive layer precedes the step of applying an adhesive layer to said silicone layer.

30. The method of claim 25 wherein said predetermined period of time is at least about 7 seconds.

31. The method of claim 30 wherein said face sheet is composed of a paper or a plastic.

32. The method of claim 31 wherein said face sheet is thermally printable.

33. The method of claim 30 wherein said substrate comprises a paper.

34. The method of claim 33 wherein said face sheet is composed of a paper or a plastic.

35. The method of claim 34 wherein said face sheet is thermally printable.

36. The method of claim 33 wherein said elevated temperature is at least about 150 degrees F.

37. The method of claim 36 wherein the steps of heating said silicone layer, applying said adhesive layer, and adhering said face sheet are all performed on a machine without removing said substrate from said machine.

38. The method of claim 37 wherein said substrate follows a convoluted path between the steps of heating said silicone layer and applying said adhesive layer.

39. The method of claim 38 wherein the step of applying an adhesive layer to said silicone layer precedes the step of adhering a face sheet to said adhesive layer.

40. The method of claim 38 wherein the step of adhering a face sheet to said adhesive layer precedes the step of applying an adhesive layer to said silicone layer.

41. The method of claim 36 wherein said elevated temperature is at least about 200 degrees F.

42. The method of claim 41 wherein said adhesive comprises an organic phase dispersed as an emulsion in an aqueous phase.

43. The method of claim 42 wherein said adhesive comprises a styrene-butadiene copolymer.

44. The method of claim 43 wherein the step of applying an adhesive layer to said silicone layer precedes the step of adhering a face sheet to said adhesive layer.

45. The method of claim 43 wherein the step of adhering a face sheet to said adhesive layer precedes the step of applying an adhesive layer to said silicone layer.

46. The method of claim 25 wherein said silicone, prior to curing, is in a liquid phase.

47. The method of claim 46 said silicone, prior to curing, is a polymerizable silicone.

48. The method of claim 47 wherein said adhesive comprises an organic phase dispersed as an emulsion in an aqueous phase.

49. The method of claim 48 wherein said adhesive comprises a styrene-butadiene copolymer.

50. The method of claim 47 wherein, prior to curing, said silicone is cationic photoinitiated.

51. The method of claim 50 wherein said face sheet is composed of a paper or a plastic.

52. The method of claim 51 wherein said face sheet is thermally printable.

53. The method of claim 50 wherein said silicone, prior to curing, is an epoxy-modified polysiloxane.

54. The method of claim 53 wherein said silicone, prior to curing, is epoxy-modified polydimethylsiloxane.

55. The method of claim 54 wherein said substrate comprises a paper.

56. The method of claim 55 wherein said face sheet is composed of a paper or a plastic.

57. The method of claim 56 wherein said face sheet is thermally printable.

58. The method of claim 55 wherein said elevated temperature is at least about 150 degrees F.

59. The method of claim 58 wherein the steps of heating said silicone layer, applying said adhesive layer, and adhering said face sheet are all performed on a machine without removing said substrate from said machine.

60. The method of claim 55 wherein said substrate follows a convoluted path between the steps of heating said silicone layer and applying said adhesive layer.

61. The method of claim 60 wherein the step of applying an adhesive layer to said silicone layer precedes the step of adhering a face sheet to said adhesive layer.

62. The method of claim 60 wherein the step of adhering a face sheet to said adhesive layer precedes the step of applying an adhesive layer to said silicone layer.

63. The method of claim 58 wherein said predetermined period of time is at least about 7 seconds.

64. The method of claim 55 wherein said elevated temperature is at least about 200 degrees F.

65. The method of claim 64 wherein said adhesive comprises an organic phase dispersed as an emulsion in an aqueous phase.

66. The method of claim 65 wherein said adhesive comprises a styrene-butadiene copolymer.

67. The method of claim 23 wherein the step of applying an adhesive layer to said silicone layer precedes the step of adhering a face sheet to said adhesive layer.

68. The method of claim 23 wherein the step of adhering a face sheet to said adhesive layer precedes the step of applying an adhesive layer to said silicone layer.

69. The method of claim 23 wherein the steps of heating said silicone layer, applying said adhesive layer, and adhering said face sheet are all performed on a machine without removing said substrate from said machine.

70. The method of claim 69 wherein said substrate follows a convoluted path between the steps of heating said silicone layer and applying said adhesive layer.

71. The method of claim 70 wherein the step of applying an adhesive layer to said silicone layer precedes the step of adhering a face sheet to said adhesive layer.

72. The method of claim 70 wherein the step of adhering a face sheet to said adhesive layer precedes the step of applying an adhesive layer to said silicone layer.

73. A method of making a label having a coating of adhesive and a liner covering said adhesive comprising:
(A) placing a layer of substantially liquid, uncured, UV-curable silicone on a substrate;
(B) curing said layer of uncured silicone by exposing said layer to UV light;
(C) after the step of curing said silicone layer, heating said silicone layer at an elevated temperature above room temperature;
(D) after the passage of a predetermined period of time after heating said silicone layer at said elevated temperature, applying a substantially liquid adhesive layer to said silicone layer; and
(E) adhering a face sheet to said adhesive applied to said silicone layer.

74. The method of claim 73 wherein the step of applying an adhesive layer to said silicone layer precedes the step of adhering a face sheet to said adhesive layer.

75. The method of claim 73 wherein the step of adhering a face sheet to said adhesive layer precedes the step of applying an adhesive layer to said silicone layer.

76. The method of claim 73 the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

77. The method of claim 76 wherein said substrate follows a convoluted path between the steps of heating said silicone layer and applying said adhesive layer.

78. The method of claim 77 wherein the step of applying an adhesive layer to said silicone layer precedes the step of adhering a face sheet to said adhesive layer.

79. The method of claim 77 wherein the step of adhering a face sheet to said adhesive layer precedes the step of applying an adhesive layer to said silicone layer.

80. The method of claim 73 wherein said predetermined period of time is at least about 3 seconds.

81. The method of claim 80 wherein said elevated temperature is at least about 125 degrees F.

82. The method of claim 81 wherein the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

83. The method of claim 82 wherein said substrate follows a convoluted path between the steps of heating said silicone layer and applying said adhesive layer.

84. The method of claim 83 wherein the step of applying an adhesive layer to said silicone layer precedes the step of adhering a face sheet to said adhesive layer.

85. The method of claim 83 wherein the step of adhering a face sheet to said adhesive layer precedes the step of applying an adhesive layer to said silicone layer.

86. The method of claim 81 wherein said predetermined period of time is at least about 7 seconds.

87. The method of claim 86 wherein said face sheet is composed of a paper or a plastic.

88. The method of claim 87 wherein said face sheet is thermally printable.

89. The method of claim 86 wherein said substrate comprises a paper.

90. The method of claim 89 wherein said face sheet is composed of a paper or a plastic.

91. The method of claim 90 wherein said face sheet is thermally printable.

92. The method of claim 89 wherein said elevated temperature is at least about 150 degrees F.

93. The method of claim 92 wherein the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

94. The method of claim 93 wherein said substrate follows a convoluted path between the steps of heating said silicone layer and applying said adhesive layer.

95. The method of claim 94 wherein the step of applying an adhesive layer to said silicone layer precedes the step of adhering a face sheet to said adhesive layer.

96. The method of claim 94 wherein the step of adhering a face sheet to said adhesive layer precedes the step of applying an adhesive layer to said silicone layer.

97. The method of claim 92 wherein said elevated temperature is at least about 200 degrees F.

98. The method of claim 97 wherein said adhesive comprises an organic phase dispersed as an emulsion in an aqueous phase.

99. The method of claim 98 wherein said adhesive comprises a styrene-butadiene copolymer.

100. The method of claim 99 wherein the step of applying an adhesive layer to said silicone layer precedes the step of adhering a face sheet to said adhesive layer.

101. The method of claim 99 wherein the step of adhering a face sheet to said adhesive layer precedes the step of applying an adhesive layer to said silicone layer.

102. The method of claim 81 wherein said silicone, prior to curing, is in a liquid phase.

103. The method of claim 102 said silicone, prior to curing, is a polymerizable silicone.

104. The method of claim 103 wherein said adhesive comprises an organic phase dispersed as an emulsion in an aqueous phase.

105. The method of claim 104 wherein said adhesive comprises a styrene-butadiene copolymer.

106. The method of claim 103 wherein, prior to curing, said silicone is cationic photoinitiated.

107. The method of claim 106 wherein said face sheet is composed of a paper or a plastic.

108. The method of claim 107 wherein said face sheet is thermally printable.

109. The method of claim 106 wherein said silicone, prior to curing, is an epoxy-modified polysiloxane.

110. The method of claim 109 wherein said silicone, prior to curing, is epoxy-modified polydimethylsiloxane.

111. The method of claim 110 wherein said substrate comprises a paper.

112. The method of claim 111 wherein said face sheet is composed of a paper or a plastic.

113. The method of claim 112 wherein said face sheet is thermally printable.

114. The method of claim 111 wherein said elevated temperature is at least about 150 degrees F.

115. The method of claim 114 wherein the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

116. The method of claim 115 wherein said substrate follows a convoluted path between the steps of heating said silicone layer and applying said adhesive layer.

117. The method of claim 116 wherein the step of applying an adhesive layer to said silicone layer precedes the step of adhering a face sheet to said adhesive layer.

118. The method of claim 116 wherein the step of adhering a face sheet to said adhesive layer precedes the step of applying an adhesive layer to said silicone layer.

119. The method of claim 114 wherein said predetermined period of time is at least about 7 seconds.

120. The method of claim 111 wherein said elevated temperature is at least about 200 degrees F.

121. The method of claim 120 wherein said adhesive comprises an organic phase dispersed as an emulsion in an aqueous phase.

122. The method of claim 121 wherein said adhesive comprises a styrene-butadiene copolymer.

123. A method of applying an adhesive layer to a substrate having thereon a layer of UV-cured silicone comprising:
(A) heating said UV-cured silicone layer at an elevated temperature above ambient temperature; and
(B) after the passage of a predetermined period of time after heating said silicone layer at said elevated temperature, applying a substantially liquid adhesive layer to said silicone layer.

124. The method of claim 123 wherein said predetermined period of time is at least about 3 seconds.

125. The method of claim 124 wherein said elevated temperature is at least about 125 degrees F.

126. The method of claim 125 wherein said predetermined period of time is at least about 7 seconds.

127. The method of claim 126 wherein said substrate comprises a paper.

128. The method of claim 127 wherein said elevated temperature is at least about 150 degrees F.

129. The method of claim 128 wherein said elevated temperature is at least about 200 degrees F.

130. The method of claim 129 wherein said adhesive comprises an organic phase dispersed as an emulsion in an aqueous phase.

131. The method of claim 130 wherein said adhesive comprises a styrene-butadiene copolymer.

132. The method of claim 125 wherein said silicone, prior to curing, is in a liquid phase.

133. The method of claim 132 said silicone, prior to curing, is a polymerizable silicone.

134. The method of claim 133 wherein said adhesive comprises an organic phase dispersed as an emulsion in an aqueous phase.

135. The method of claim 134 wherein said adhesive comprises a styrene-butadiene copolymer.

136. The method of claim 133 wherein, prior to curing, said silicone is cationic photoinitiated.

137. The method of claim 136 wherein said silicone, prior to curing, is an epoxy-modified polysiloxane.

138. The method of claim 137 wherein said silicone, prior to curing, is epoxy-modified polydimethylsiloxane.

139. The method of claim 138 wherein said substrate comprises a paper.

140. The method of claim 139 wherein said elevated temperature is at least about 150 degrees F.

141. The method of claim 140 wherein said predetermined period of time is at least about 7 seconds.

142. The method of claim 139 wherein said elevated temperature is at least about 200 degrees F.

143. The method of claim 142 wherein said adhesive comprises an organic phase dispersed as an emulsion in an aqueous phase.

144. The method of claim 143 wherein said adhesive comprises a styrene-butadiene copolymer.

145. A method of making, from a substrate having a layer of UV cured silicone, a label having a coating of adhesive and a face sheet covering said adhesive comprising:
(A) heating said UV-cured silicone layer at an elevated temperature above ambient temperature;
(B) after the passage of a predetermined period of time after heating said silicone layer at said elevated temperature, applying a substantially liquid adhesive layer to said silicone layer; and
(C) adhering a face sheet to said adhesive layer.

146. The method of claim 145 wherein the step of applying an adhesive layer to said silicone layer precedes the step of adhering a face sheet to said adhesive layer.

147. The method of claim 145 wherein the step of adhering a face sheet to said adhesive layer precedes the step of applying an adhesive layer to said silicone layer.

148. The method of claim 145 wherein the steps of heating said silicone layer, applying said adhesive layer, and adhering said face sheet are all performed on a machine without removing said substrate from said machine.

149. The method of claim 148 wherein said substrate follows a convoluted path between the steps of heating said silicone layer and applying said adhesive layer.

150. The method of claim 149 wherein the step of applying an adhesive layer to said silicone layer precedes the step of adhering a face sheet to said adhesive layer.

151. The method of claim wherein the step of adhering a face sheet to said adhesive layer precedes the step of applying an adhesive layer to said silicone layer.

152. The method of claim 145 wherein said predetermined period of time is at least about 3 seconds.

153. The method of claim 152 wherein said elevated temperature is at least about 125 degrees F.

154. The method of claim 153 wherein the steps of heating said silicone layer, applying said adhesive layer, and adhering said face sheet are all performed on a machine without removing said substrate from said machine.

155. The method of claim 154 wherein said substrate follows a convoluted path between the steps of heating said silicone layer and applying said adhesive layer.

156. The method of claim 155 wherein the step of applying an adhesive layer to said silicone layer precedes the step of adhering a face sheet to said adhesive layer.

157. The method of claim 155 wherein the step of adhering a face sheet to said adhesive layer precedes the step of applying an adhesive layer to said silicone layer.

158. The method of claim 153 wherein said predetermined period of time is at least about 7 seconds.

159. The method of claim 158 wherein said face sheet is composed of a paper or a plastic.

160. The method of claim 159 wherein said face sheet is thermally printable.

161. The method of claim 158 wherein said substrate comprises a paper.

162. The method of claim 161 wherein said face sheet is composed of a paper or a plastic.

163. The method of claim 162 wherein said face sheet is thermally printable.

164. The method of claim 161 wherein said elevated temperature is at least about 150 degrees F.

165. The method of claim 164 wherein the steps of heating said silicone layer, applying said adhesive layer, and adhering said face sheet are all performed on a machine without removing said substrate from said machine.

166. The method of claim 165 wherein said substrate follows a convoluted path between the steps of heating said silicone layer and applying said adhesive layer.

167. The method of claim 166 wherein the step of applying an adhesive layer to said silicone layer precedes the step of adhering a face sheet to said adhesive layer.

168. The method of claim 166 wherein the step of adhering a face sheet to said adhesive layer precedes the step of applying an adhesive layer to said silicone layer.

169. The method of claim 164 wherein said elevated temperature is at least about 200 degrees F.

170. The method of claim 169 wherein said adhesive comprises an organic phase dispersed as an emulsion in an aqueous phase.

171. The method of claim 170 wherein said adhesive comprises a styrene-butadiene copolymer.

172. The method of claim 171 wherein the step of applying an adhesive layer to said silicone layer precedes the step of adhering a face sheet to said adhesive layer.

173. The method of claim 171 wherein the step of adhering a face sheet to said adhesive layer precedes the step of applying an adhesive layer to said silicone layer.

174. The method of claim 153 wherein said silicone, prior to curing, is in a liquid phase.

175. The method of claim 174 said silicone, prior to curing, is a polymerizable silicone.

176. The method of claim 175 wherein said adhesive comprises an organic phase dispersed as an emulsion in an aqueous phase.

177. The method of claim 176 wherein said adhesive comprises a styrene-butadiene copolymer.

178. The method of claim 177 wherein said face sheet is thermally printable.

179. The method of claim 175 wherein, prior to curing, said silicone is cationic photoinitiated.

180. The method of claim 179 wherein said face sheet is composed of a paper or a plastic.

181. The method of claim 179 wherein said silicone, prior to curing, is an epoxy-modified polysiloxane.

182. The method of claim 181 wherein said silicone, prior to curing, is epoxy-modified polydimethylsiloxane.

183. The method of claim 182 wherein said substrate comprises a paper.

184. The method of claim 183 wherein said face sheet is composed of a paper or a plastic.

185. The method of claim wherein said face sheet is thermally printable.

186. The method of claim 183 wherein said elevated temperature is at least about 150 degrees F.

187. The method of claim 186 wherein the steps of heating said silicone layer, applying said adhesive layer, and adhering said face sheet are all performed on a machine without removing said substrate from said machine.

188. The method of claim 187 wherein said substrate follows a convoluted path between the steps of heating said silicone layer and applying said adhesive layer.

189. The method of claim 188 wherein the step of applying an adhesive layer to said silicone layer precedes the step of adhering a face sheet to said adhesive layer.

190. The method of claim 188 wherein the step of adhering a face sheet to said adhesive layer precedes the step of applying an adhesive layer to said silicone layer.

191. The method of claim 186 wherein said predetermined period of time is at least about 7 seconds.

192. The method of claim 183 wherein said elevated temperature is at least about 200 degrees F.

193. The method of claim 192 wherein said adhesive comprises an organic phase dispersed as an emulsion in an aqueous phase.

194. The method of claim 193 wherein said adhesive comprises a styrene-butadiene copolymer.

195. A method of making a label having a coating of adhesive and a liner covering said adhesive comprising:
  (A) placing a layer of substantially liquid, uncured, UV-curable silicone on a substrate;
  (B) curing said layer of uncured silicone by exposing said layer to UV light;
  (C) after the step of curing said silicone layer, heating said silicone layer at an elevated temperature above ambient temperature;
  (D) after the passage of a predetermined period of time after heating said silicone layer at said elevated temperature, applying a substantially liquid adhesive layer to said silicone layer; and
  (E) adhering a face sheet to said adhesive applied to said silicone layer.

196. The method of claim 195 wherein the step of applying an adhesive layer to said silicone layer precedes the step of adhering a face sheet to said adhesive layer.

197. The method of claim 195 wherein the step of adhering a face sheet to said adhesive layer precedes the step of applying an adhesive layer to said silicone layer.

198. The method of claim 195 wherein the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

199. The method of claim 198 wherein said substrate follows a convoluted path between the steps of heating said silicone layer and applying said adhesive layer.

200. The method of claim 199 wherein the step of applying an adhesive layer to said silicone layer precedes the step of adhering a face sheet to said adhesive layer.

201. The method of claim 199 wherein the step of adhering a face sheet to said adhesive layer precedes the step of applying an adhesive layer to said silicone layer.

202. The method of claim 195 wherein said predetermined period of time is at least about 3 seconds.

203. The method of claim 202 wherein said elevated temperature is at least about 125 degrees F.

204. The method of claim 203 wherein the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

205. The method of claim 204 wherein said substrate follows a convoluted path between the steps of heating said silicone layer and applying said adhesive layer.

206. The method of claim 205 wherein the step of adhering a face sheet to said adhesive layer precedes the step of applying an adhesive layer to said silicone layer.

207. The method of claim 203 wherein said predetermined period of time is at least about 7 seconds.

208. The method of claim 207 wherein said face sheet is composed of a paper or a plastic.

209. The method of claim 208 wherein said face sheet is thermally printable.

210. The method of claim 207 wherein said substrate comprises a paper.

211. The method of claim 210 wherein said face sheet is composed of a paper or a plastic.

212. The method of claim 211 wherein said face sheet is thermally printable.

213. The method of claim 210 wherein said elevated temperature is at least about 150 degrees F.

214. The method of claim 213 wherein the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

215. The method of claim 214 wherein said substrate follows a convoluted path between the steps of heating said silicone layer and applying said adhesive layer.

216. The method of claim 215 wherein the step of applying an adhesive layer to said silicone layer precedes the step of adhering a face sheet to said adhesive layer.

217. The method of claim 215 wherein the step of adhering a face sheet to said adhesive layer precedes the step of applying an adhesive layer to said silicone layer.

218. The method of claim 213 wherein said elevated temperature is at least about 200 degrees F.

219. The method of claim 218 wherein said adhesive comprises an organic phase dispersed as an emulsion in an aqueous phase.

220. The method of claim 219 wherein said adhesive comprises a styrene-butadiene copolymer.

221. The method of claim 220 wherein the step of applying an adhesive layer to said silicone layer precedes the step of adhering a face sheet to said adhesive layer.

222. The method of claim 220 wherein the step of adhering a face sheet to said adhesive layer precedes the step of applying an adhesive layer to said silicone layer.

223. The method of claim 203 wherein said silicone, prior to curing, is in a liquid phase.

224. The method of claim 223 said silicone, prior to curing, is a polymerizable silicone.

225. The method of claim 224 wherein said adhesive comprises an organic phase dispersed as an emulsion in an aqueous phase.

226. The method of claim 225 wherein said adhesive comprises a styrene-butadiene copolymer.

227. The method of claim 224 wherein, prior to curing, said silicone is cationic photoinitiated.

228. The method of claim 227 wherein said face sheet is composed of a paper or a plastic.

229. The method of claim 228 wherein said face sheet is thermally printable.

230. The method of claim 227 wherein said silicone, prior to curing, is an epoxy-modified polysiloxane.

231. The method of claim 230 wherein said silicone, prior to curing, is epoxy-modified polydimethylsiloxane.

232. The method of claim 231 wherein said substrate comprises a paper.

233. The method of claim 232 wherein said face sheet is composed of a paper or a plastic.

234. The method of claim 233 wherein said face sheet is thermally printable.

235. The method of claim 232 wherein said elevated temperature is at least about 150 degrees F.

236. The method of claim 235 wherein the steps of placing said layer of substantially liquid silicone on a substrate, curing said layer of uncured silicone by exposing said layer to UV light; heating said silicone layer, applying said adhesive layer, and adhering said face sheet are all performed on a machine without removing said substrate from said machine.

237. The method of claim 236 wherein said substrate follows a convoluted path between the steps of heating said silicone layer and applying said adhesive layer.

238. The method of claim 237 wherein the step of applying an adhesive layer to said silicone layer precedes the step of adhering a face sheet to said adhesive layer.

239. The method of claim 237 wherein the step of adhering a face sheet to said adhesive layer precedes the step of applying an adhesive layer to said silicone layer.

240. The method of claim 235 wherein said predetermined period of time is at least about 7 seconds.

241. The method of claim 232 wherein said elevated temperature is at least about 200 degrees F.

242. The method of claim 241 wherein said adhesive comprises an organic phase dispersed as an emulsion in an aqueous phase.

243. The method of claim 242 wherein said adhesive comprises a styrene-butadiene copolymer.

244. The method of claim 195 wherein the step of applying an adhesive layer to said silicone layer precedes the step of adhering a face sheet to said adhesive layer.

* * * * *